(12) United States Patent
Ren et al.

(10) Patent No.: US 8,457,002 B2
(45) Date of Patent: Jun. 4, 2013

(54) METHOD AND APPARATUS FOR GRANT LOSS DETECTION AND RELATED PROCESSING IN A WIRELESS COMMUNICATION NETWORK

(75) Inventors: Hong Ren, Kanata (CA); Xixian Chen, Ottawa (CA); Xiao-Dong Li, Ottawa (CA); Patrick Lie Chin Cheong, Kanata (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 498 days.

(21) Appl. No.: 12/846,003

(22) Filed: Jul. 29, 2010

(65) Prior Publication Data

US 2012/0026985 A1 Feb. 2, 2012

(51) Int. Cl.
*H04W 24/00* (2009.01)

(52) U.S. Cl.
USPC .......................................... 370/242; 370/329

(58) Field of Classification Search
USPC ................................................. 370/242, 329
See application file for complete search history.

(56) References Cited

U.S. PATENT DOCUMENTS

2004/0162083 A1* 8/2004 Chen et al. .................... 455/454
2010/0157916 A1 6/2010 Kim et al.
2011/0116457 A1* 5/2011 Damnjanovic et al. ........ 370/329
2011/0310820 A1* 12/2011 Liao .............................. 370/329
2013/0022007 A1* 1/2013 Berggren et al. ............. 370/329

FOREIGN PATENT DOCUMENTS

WO 2010074490 A2 7/2010

OTHER PUBLICATIONS

3GPP TSG RAN WG1 meeting #59bis, R1-100099, 'DAI transmission for LTE-A TDD', Samsung, Jan. 18-22, 2010, pp. 1-4.*

* cited by examiner

*Primary Examiner* — Melvin Marcelo
(74) *Attorney, Agent, or Firm* — Coats & Bennett, P.L.L.C.

(57) ABSTRACT

The present invention provides a method and apparatus for improving wireless communication network performance and efficiency, based on detecting the occurrence of grant loss in relation to the transmission of scheduling grants to mobile terminals over a downlink control channel. Grant loss detection is based on detecting erasure events corresponding to the transmitted scheduling grants, and the incidence of grant loss with respect to a given mobile terminal can be tracked and used to compensate the control value(s) used for link adaptation of the downlink control channel, with respect to that terminal. Additionally, or alternatively, when a given grant is determined to be lost, a new grant is sent and the HARQ redundancy version is reset for the newly scheduled transmission.

28 Claims, 12 Drawing Sheets

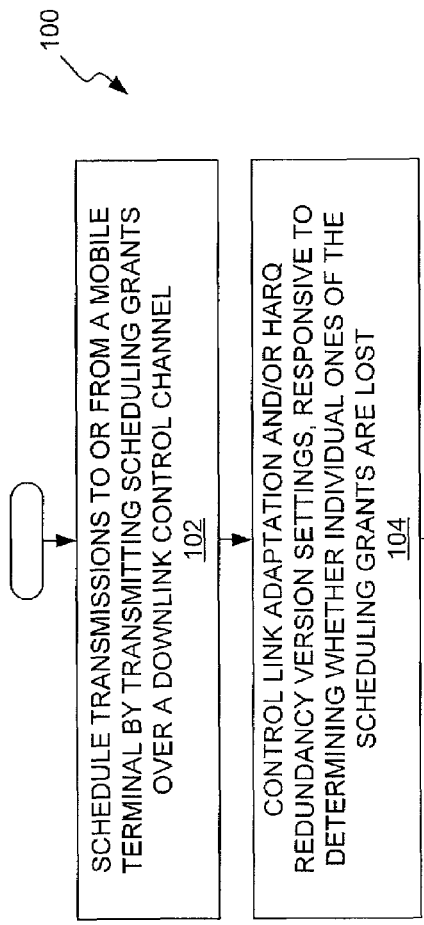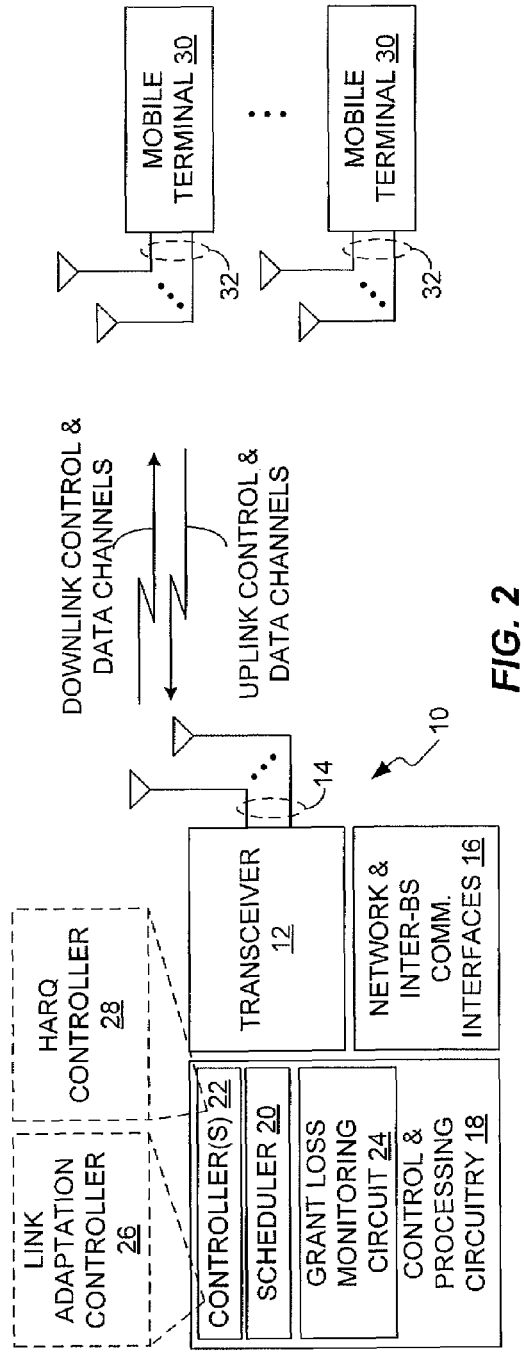

| CORRECTED SINR | # OF CCEs | EPRE |
|---|---|---|
| SINR >= A1 | 1 | C1 |
| A2 <= SINR < A1 | 2 | C1 |
| A3 <= SINR < A2 | 4 | C1 |
| A4 <= SINR < A3 | 8 | C1 |
| A5 <= SINR < A4 | 8 | C2 |
| SINR < A5 | 8 | C3 |

FIG. 7

| CORRECTED CR | # OF CCEs | EPRE |
|---|---|---|
| CR >= R1 | 1 | C1 |
| R2 <= CR < R1 | 2 | C1 |
| R3 <= CR < R2 | 4 | C1 |
| R4 <= CR < R3 | 8 | C1 |
| R5 <= CR < R4 | 8 | C2 |
| CR < R5 | 8 | C3 |

FIG. 8

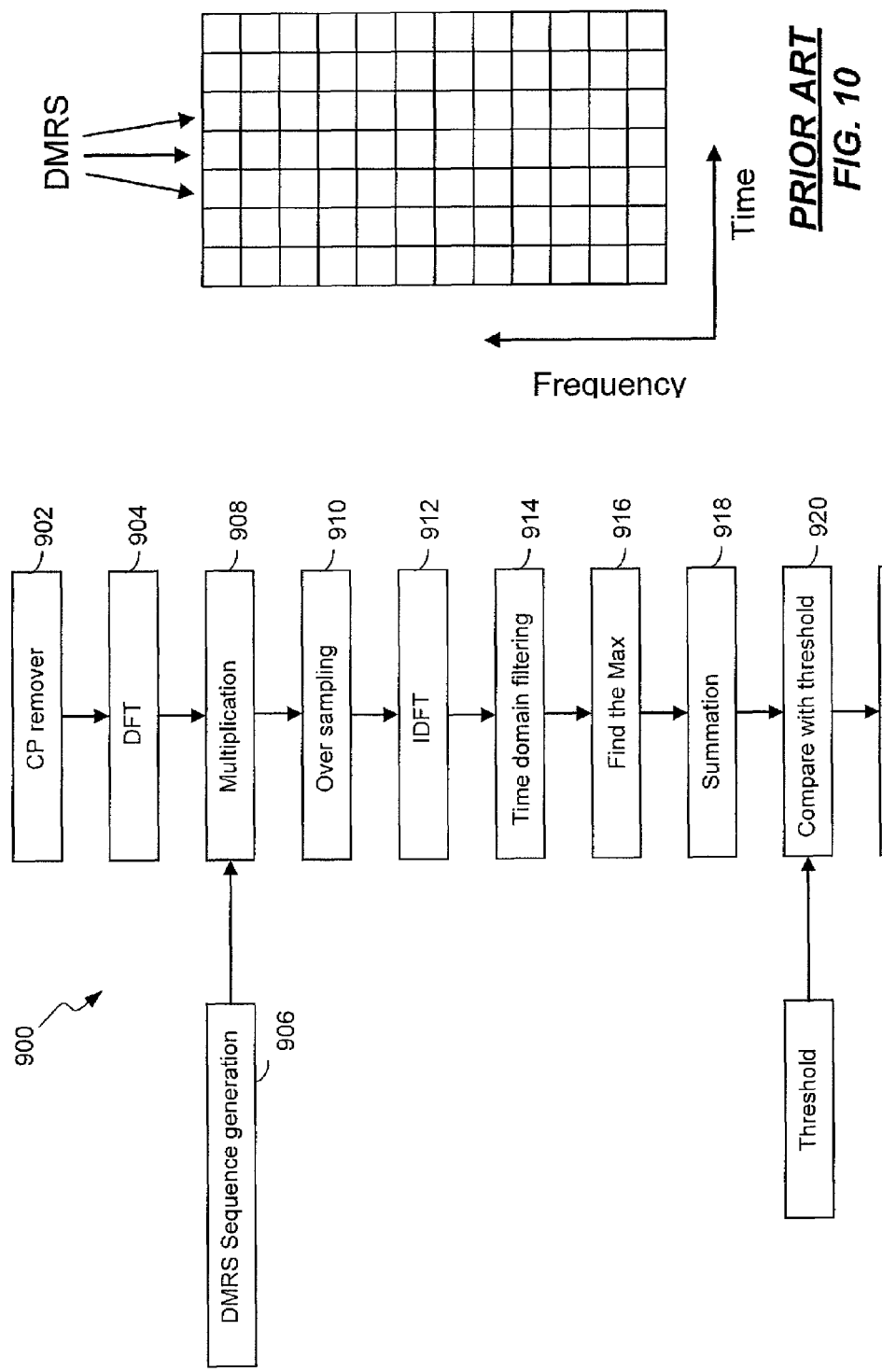

METHOD AND APPARATUS FOR GRANT LOSS DETECTION AND RELATED PROCESSING IN A WIRELESS COMMUNICATION NETWORK

FIELD OF THE INVENTION

The present invention generally relates to wireless communication systems, and particularly relates to grant loss detection and related processing in wireless systems that use grant-based transmission schemes.

BACKGROUND

Certain wireless communication networks employ control channels that lack direct reception quality feedback, as would normally be used for link adaptation on such channels. Long Term Evolution (LTE) networks provide a ready example, as do WiMax networks and certain others.

As a specific example in the LTE context, user equipment does not send acknowledgment information for signaling received from an eNodeB on the Physical Downlink Control Channel (PDCCH). The lack of acknowledgments means that it is not easy to detect whether information sent over the PDCCH is successfully received by a user terminal. Examples of such information include uplink and downlink grants, which are transmitted in LTE as part of user scheduling operations.

Lacking direct feedback for the PDCCH, LTE provides an algorithm for "outer loop" control of the coding rate for the PDCCH. Feedback received for transmissions sent on the Physical Downlink Shared Channel (PDSCH) drives the algorithm. Consequently, with this approach, the eNodeB corrects the Signal-to-Noise-and-Interference Ratio (SINR) of the PDCCH, responsive to channel quality feedback received for the PDSCH.

Adapting the PDCCH according to PDSCH feedback works well, at least to the extent that reception conditions are about the same for the PDCCH and the PDSCH. However, it is more "normal" for the reception conditions to differ between the PDCCH and the PDSCH. For example, while these channels may experience the same path loss, they likely will experience different levels/kinds of interference, given that they use different channel resources. Thus, driving the PDSCH outer loop control with PDCCH feedback results in suboptimal adaptation of the PDSCH, to the extent that channel conditions for the PDSCH and PDCCH diverge. In turn, sub-optimal adaptation of the PDCCH leads to network inefficiency, among other problems.

SUMMARY

In one aspect, the present invention provides a method and apparatus for improving wireless communication network performance and efficiency, based on detecting the occurrence of scheduling grant loss. For example, the incidence of grant loss with respect to a given mobile terminal can be tracked and used to compensate the control value(s) used for link adaptation of the downlink control channel used to send grants to the terminal. Additionally, or alternatively, one or more aspects of Hybrid Automatic Repeat reQuest (HARQ) processing are controlled responsive to grant loss. For example, when a given grant is determined to be lost, a new grant is sent and the HARQ redundancy version is reset for the newly scheduled transmission.

In one or more embodiments, a method at a wireless communication network base station provides for the detection of grant losses for scheduling grants sent over a downlink control channel. The method includes scheduling transmissions to or from a mobile terminal by transmitting scheduling grants over the downlink control channel to the mobile terminal, and controlling link adaption of the downlink control channel, or HARQ redundancy version settings for the scheduled transmissions, or both, responsive to determining whether individual scheduling grants are lost. Determining whether any given scheduling grant is lost is based on detecting an erasure event corresponding to the scheduled transmission.

In another embodiment, the present invention provides a base station that is configured for operation in a wireless communication network. The base station includes processing and control circuitry that is configured to carry out the above-described method, or variations thereof. In at least one such embodiment, the base station comprises a transceiver configured to transmit signals to mobile terminals, and to receive signals from mobile terminals, and a scheduler configured to schedule transmissions to or from a mobile terminal by transmitting scheduling grants over the downlink control channel to the mobile terminal. The base station also includes one or more controllers that are configured to control link adaption of the downlink control channel, or HARQ redundancy version settings for the scheduled transmissions, or both, responsive to determining whether individual scheduling grants are lost. Correspondingly, the base station includes a grant loss monitoring circuit configured to determine whether any given scheduling grant is lost, based on detecting an erasure event corresponding to the scheduled transmission.

With the above in mind, one example implementation of the present invention is a Long Term Evolution (LTE) eNodeB that is configured to detect the loss of scheduling grants sent over its Physical Downlink Control Channel (PDCCH). In one embodiment, the eNodeB is configured to set the coding rate and/or transmit power of the downlink control channel, with respect to a given mobile terminal, based on tracking the incidence of grant loss for that terminal. In the same or another embodiment, the eNodeB resets the HARQ redundancy version for a transmission to or from the mobile terminal, as part of sending a new scheduling grant to the terminal in response to detecting the loss of a given grant.

In any case, the eNodeB in at least one embodiment is configured to determine that a given scheduling grant is lost, based on detecting an erasure event corresponding to the scheduled transmission that is associated with the grant. In the case of a downlink scheduling grant, the eNodeB detects erasure as the absence of acknowledgment information from the terminal for the scheduled downlink transmission—e.g., the absence of acknowledgment information on the Physical Uplink Control Channel (PUCCH), or on the Physical Uplink Shared Channel (PUSCH). In the case of an uplink scheduling grant, the eNodeB detects erasure as the absence of the scheduled uplink transmission from the terminal on the PUSCH.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 1 is a logic flow diagram illustrating one embodiment of a method of grant loss detection and corresponding control, such as may be implemented at a base station in accordance with the teachings presented herein.

FIG. 2 is a block diagram illustrating an example configuration of a wireless communication network base station, e.g., an eNodeB in an LTE network, where the base station is configured for grant loss detection and corresponding control.

FIGS. 7 and 8 are diagrams of example data structures (e.g., memory-stored Look-up Tables), for use with the functional processing depicted in FIGS. 5 and 6, respectively.

FIG. 9 is a logic flow diagram illustrating an example algorithm for detecting UL grant loss based on PUSCH DMRS detection FIG. 10 is a diagram of a known structure for a PUCCH resource block in LTE, for PUCCH formats 1a/1b and a normal Cyclic Prefix (CP).

DETAILED DESCRIPTION

Figure 4:
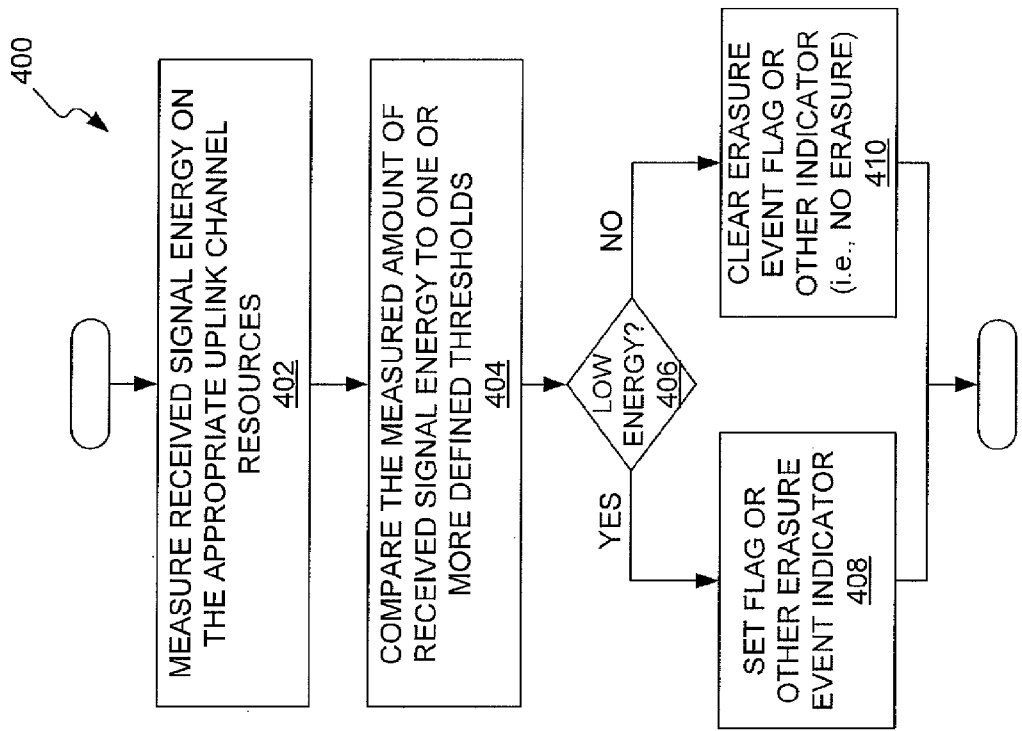
FIGS. 3 and 4 are logic flow diagrams providing example processing details for certain aspects of the processing more generally depicted in FIG. 1.

By way of non-limiting example, FIG. 1 illustrates a method 100 at a wireless communication network base station of detecting grant losses for scheduling grants sent over a downlink control channel. The method 100 includes scheduling transmissions to or from a mobile terminal by transmitting scheduling grants over the downlink control channel to the mobile terminal (Step 102). The method further includes controlling link adaption of the downlink control channel, or HARQ redundancy version settings for the scheduled transmissions, or both, responsive to determining whether individual scheduling grants are lost (Step 104). In at least one embodiment of the method, determining whether any given scheduling grant is lost is based on detecting an erasure event corresponding to the scheduled transmission.

FIG. 2 illustrates an example base station 10, which is configured according to the above-described method, or variations thereof. In the illustration, the base station 10 includes a transceiver 12 and one or more associated antennas 14, network and inter-base-station communication interfaces 16, and control and processing circuitry 18. At least functionally, the illustrated control and processing circuitry 18 includes a scheduler 20, one or more controllers 22, and a grant loss monitoring circuit (or circuits) 24. The one or more controllers 22 include, for example, a link adaptation controller 26, and a HARQ controller 28.

In more detail, the transceiver 12 is configured to transmit signals to mobile terminals 30, and to receive signals from them. (As shown in the illustration, each mobile terminal 30 includes one or more TX/RX antennas 32, for communicating with the base station 10.) In cooperative association with the transceiver 12, the scheduler 20 is configured to schedule transmissions to or from any given mobile ten final 30 by transmitting scheduling grants over the downlink control channel to the mobile terminal 30. (Note that "mobile terminal" as used herein should be broadly understood as denoting essentially any type of user equipment, including phones, pagers, laptops, PDAs, network access modules, etc.)

Correspondingly, the one or more controllers 22 are configured to control link adaption of the downlink control channel, or one or more Hybrid Automatic Repeat reQuest (HARQ) parameters for the scheduled transmissions, or both, responsive to determining whether individual scheduling grants are lost. In particular, the link adaptation controller 26 is configured to perform one or more aspects of link adaptation responsive to monitoring grant loss. For example, it may control modulation-and-coding-scheme (MCS) selection. In another example, the link adaptation controller 26 controls the coding rate and/or transmit power of the downlink control channel.

Similarly, the HARQ controller 28 is configured to control one or more HARQ parameters, responsive to monitoring grant loss. As one example, the base station 10 re-schedules a given downlink or uplink transmission and sends a new grant, responsive to determining that the first grant was lost, and the HARQ controller 28 re-initializes the HARQ redundancy version used for the re-scheduled transmission.

Detecting grant loss falls to the grant loss monitoring circuit 24, which is configured to determine whether any given scheduling grant is lost, based on detecting an erasure event corresponding to the scheduled transmission. The grant loss monitoring circuit 24 may comprise multiple functional circuits, or logical processing arrangements, that cooperate with signal measurement circuitry in the transceiver 12, for detecting grant loss for individual ones of the mobile terminals 30. Of course, the grant loss monitoring circuit 24 may be integrated within the signal processing circuitry of the transceiver 12.

In the case that a given scheduling grant transmitted by the base station 10 is an uplink scheduling grant, which schedules an uplink transmission by the mobile terminal 30, the grant loss monitoring circuit 24 is configured to detect an erasure event by determining that the scheduled uplink transmission was not received at the base station 10. In at least one embodiment of the base station 10, the grant loss monitoring circuit 24 makes this determination by detecting a characteristically low measure of received signal energy on channel resources corresponding to the scheduled uplink transmission—i.e., the base station 10 allocates particular channel resources (time, frequency, code, etc.) to the mobile terminal 30, for use in making the scheduled uplink transmission, and can therefore monitor for the expected reception of the mobile's scheduled transmission.

The base station 10 infers that its failure to detect or otherwise receive a scheduled uplink transmission from the mobile terminal 30 means that the mobile terminal 30 did not successfully receive the uplink scheduling grant and, therefore, did not carry out the scheduled uplink transmission. Alternatively, the grant loss monitoring circuit 24 determines that the scheduled uplink transmission was not sent, based on detecting characteristically low received signal energy in combination with detecting a Cyclic Redundancy Check (CRC) failure for the scheduled uplink transmission. This alternative technique, with its additional reliance on the CRC, represents a more conservative approach to detecting grant loss.

In the case that the scheduling grant is a downlink scheduling grant, which schedules a downlink transmission to a given mobile terminal 30, the grant loss monitoring circuit 24 is configured to detect an erasure event by determining that acknowledgment information was not received from the mobile terminal 30 in correspondence with the scheduled downlink transmission. For example, the grant loss monitoring circuit 24 is configured to determine that the acknowledgment information was not received at the base station 10 by detecting a characteristically low measure of received signal energy on channel resources that are associated with the acknowledgment infix nation.

Here, it is assumed that the mobile terminal 30 is obligated to send ACK/NACK signaling on the uplink, responsive to receiving any given scheduled downlink transmission. The base station 10 therefore infers that the mobile terminal 30 did not successfully receive the downlink scheduling grant if the base station 10 does not "see" the expected acknowledgment signaling from the mobile terminal 30 in conjunction with sending the scheduled downlink transmission.

Figure 3:
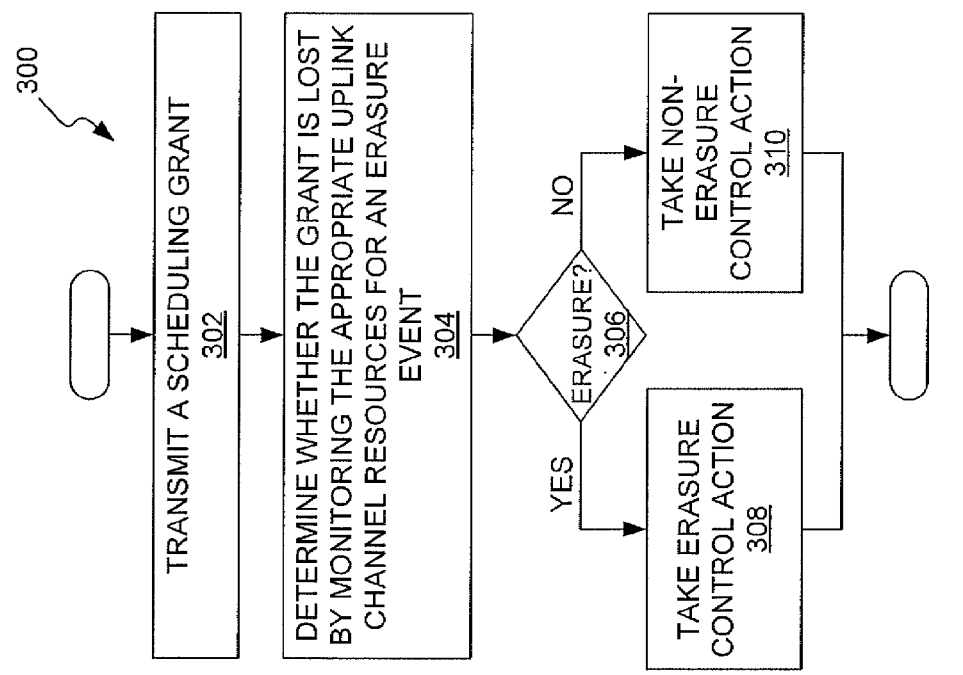

FIG. 3 presents one method for grant loss detection, which is implemented via appropriate processing circuit configurations in one or more embodiments of the base station 10. The illustrated method 300 begins with transmitting a scheduling grant to a given mobile terminal 30, over a downlink control channel (Step 302), and continues with determining whether that transmitted grant is lost (Step 304). Monitoring the appropriate uplink channel resources for an erasure event provides the basis for such determination.

"Appropriate" uplink channel resources in this case are those resources that the mobile terminal 30 is expected to use—e.g., either for sending the uplink transmission scheduled by the transmitted grant, or for acknowledging the downlink transmission scheduled by the transmitted grant. In an Orthogonal Frequency Division Multiple Access (OFDMA) example, "appropriate" channel resources may comprise particular time-frequency resources. In other types of networks, the particular uplink channel resources to be monitored may be defined by spreading codes, and/or other channelization parameters.

Continuing with the illustrated processing, detecting an erasure ("Yes" from Step 306) triggers one or more erasure responses (Step 308). Conversely, detecting a non-erasure (e.g., receiving the expected uplink transmission) triggers one or more non-erasure responses (Step 310). FIG. 4 expands on decision step 306 of FIG. 3, by illustrating example details for a method 400 of detecting an erasure event. According to the figure, detecting an erasure event requires the base station 10 to measure received signal energy on the appropriate uplink channel resources (Step 402), and to compare the measured signal energy to one or more defined thresholds (Step 404). Note that these thresholds may be static or dynamic, and different thresholds may be used under different conditions and/or in dependence on which uplink resources are being monitored. In at least one embodiment, the base station 10 includes configuration memory or other storage, and it is provisioned with at least starting values (e.g., values determined empirically or via simulation) for the erasure detection thresholds to be used.

If the received signal energy is characteristically low—i.e., below one or more defined thresholds, or otherwise within a range that is characteristically associated with the absence of an expected communication signal—then the base station 10 deems an erasure event to have occurred for the transmitted grant ("Yes" from Step 406), and it sets a flag or other logical indicator to denote erasure, for use in one or more control algorithms that are driven by erasure detection processing (Step 408). Otherwise, if the measured signal energy is above the threshold(s), then the base station 10 deems an erasure event not to have occurred (a "non-erasure"), and it clears the erasure indicator, or otherwise logically indicates the non-erasure (Step 410).

Figure 5:
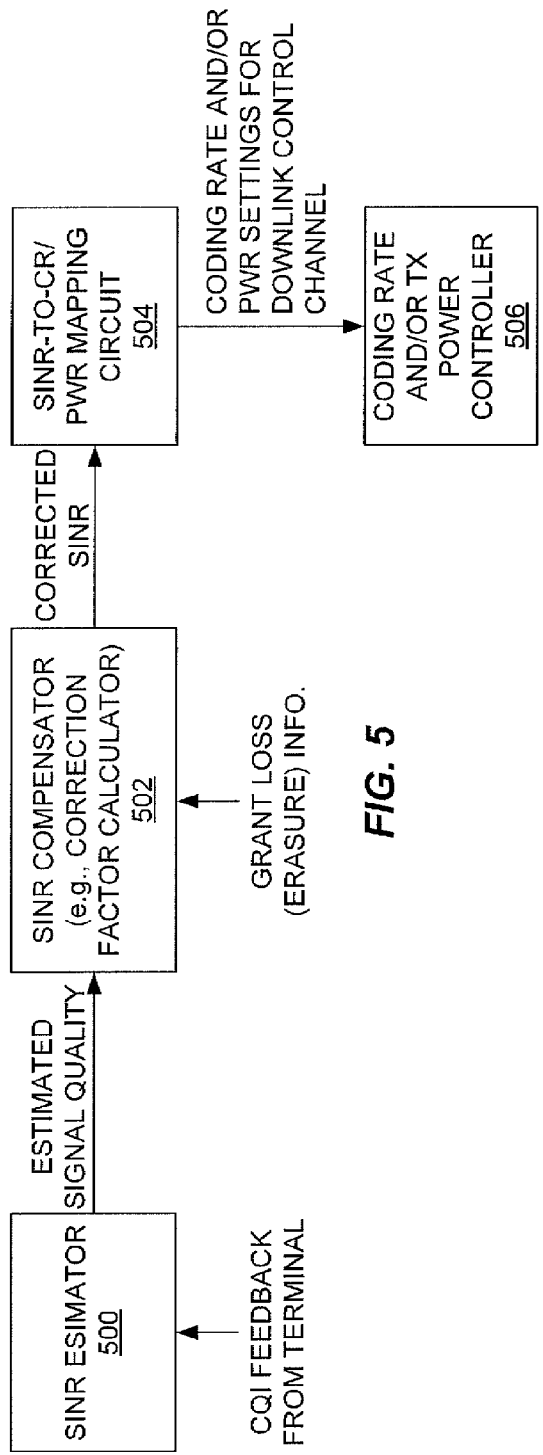
FIGS. 5 and 6 are processing flow diagrams providing two examples of processing functions for performing link adaptation in response to grant loss detection.

As for erasure/non-erasure driven control algorithms, in at least one embodiment of the base station, the one or more controllers 22 shown in FIG. 2 comprise a link adaptation controller 26 that is configured to control link adaption of the downlink control channel by controlling a coding rate or a transmit power, or both, of the downlink control channel. FIG. 5 depicts one embodiment of the functional processing elements that are included in or associated with the link adaptation controller 26.

According to the illustration, a signal quality estimator 500 receives channel quality feedback from a mobile terminal 30. For example, each mobile terminal 30 supported by the base station 10 may stream Channel Quality Indicators (CQIs) back to the base station 10, based on the mobile terminals' reception of pilot or other signals sent from the base station 10. Correspondingly, the signal quality estimator 500 may use the CQI feedback from any given terminal 30 to dynamically maintain a signal-to-noise-plus-interference ratio (SINR) estimate for the terminal 30.

Advantageously, the SINR estimate for the mobile terminal 30 is refined ("corrected") according to the grant loss determination processing taught herein. For example, in one embodiment, the link adaptation controller 26 is configured to control link adaptation of the downlink control channel, responsive to grant loss detection. For example, it may dynamically select a coding rate or a transmit power, or both, of the downlink control channel, according to a corrected signal quality estimate maintained for the mobile terminal 30. More particularly, that corrected signal quality estimate is maintained based on channel quality feedback from the mobile terminal 30, and a correction factor that the link adaptation controller adjusts upward or downward in dependence on whether any given scheduling grant is lost.

Thus, a "raw" SINR value is dynamically maintained for a given mobile terminal 30, according to CQI feedback from the terminal 30, and a corresponding, corrected SINR is maintained for the terminal 30, by adjusting the terminal's raw SINR according to a correction factor having a value driven by the incidence of grant loss for the terminal 30. One sees an example implementation of such processing via the illustration of the SINR compensator 502 in FIG. 5.

The SINR estimator 500 outputs a dynamically adjusted signal quality estimate for any given mobile terminal 30, according to CQI feedback from the mobile terminal 30, and the SINR compensator 502 "corrects" that estimate according to grant loss determinations. For example, the SINR compensator 502 may maintain a correction factor that is increased by a small amount each time a transmitted grant is not lost, and is decreased by a small amount each time a transmitted grant is deemed lost.

Of course, whether the base station 10 increases the correction factor responsive to grant loss or decreases it responsive to grant loss depends on the logic sense being used, and on how the correction factor is applied to the raw estimate of signal quality. Those skilled in the art will therefore appreciate that the above logic is a non-limiting example, and that the underlying point is that the detection of grant losses can be used to drive the "final" value of estimated signal quality downward. That logic makes sense because persistent grant losses with respect to a given mobile terminal 30 directly suggest the need to raise the SINR of the downlink control channel for that mobile terminal 30.

Thus, in FIG. 5, an SINR-to-CR/PWR mapping circuit 504 operates on the corrected SINR from the compensator 502, rather than on the raw SINR estimate from the SINR estimator 500. Here, "CR" denotes coding rate, and the mapping circuit 504 selects a coding rate and/or transmit power for the downlink control channel, to be used with respect to a given mobile terminal 30, based on the corrected SINR maintained for that mobile terminal 30. Correspondingly, a controller 506 controls the coding rate and/or transmit power of the downlink control channel corresponding to the coding rate and/or transmit power selections output by the mapping circuit 504. (In an LTE example, adjusting the transmit power may comprises setting the Energy per Resource Element or EPRE value.)

Further, it is contemplated herein that the processing of FIG. 5 may be maintained on an on-going basis, such as over the duration of the mobile terminal's Radio Resource Control (RRC) connection, for example. Thus, in at least one embodiment, the link adaptation controller 26 is configured to dynamically maintain a correction factor for any given mobile terminal 30 over the duration of a Radio Resource Control (RRC) connection with that mobile terminal 30.

In this manner, the SINR value or other control value used to drive link adaptation of the downlink control channel for the mobile terminal 30 is biased according to the incidence of grant loss for that mobile terminal 30. A higher incidence of grant loss generally drives the link adaptation control loop toward more robust coding and/or higher power, where the terms "more robust" and "higher" here, as applied to coding and power, respectively, means values that are more robust or higher than would be determined simply using the raw, uncorrected signal quality estimate or other loop control value.

Figure 6:
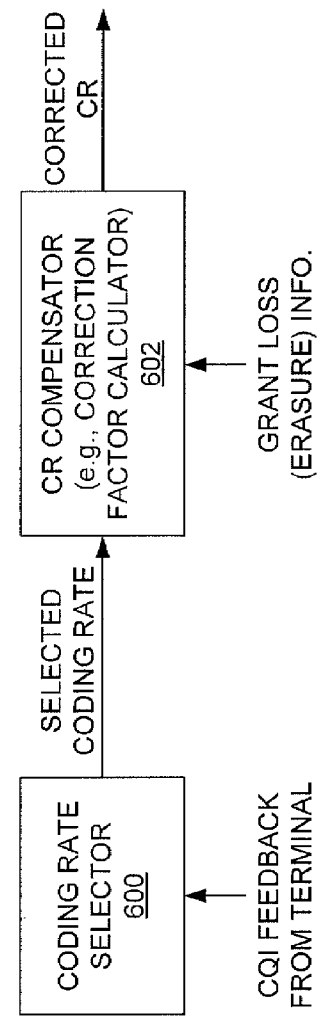

In a variation of the above SINR-mapping embodiment, FIG. 6 depicts a functional implementation of the link adaptation controller 26 that uses direct mapping of CQI feedback from the mobile terminal 30 to a coding rate for the downlink control channel. In particular, a coding rate selector 600 dynamically selects the coding rate to be used for transmitting to the mobile terminal 30 over the downlink control channel, responsive to CQI feedback from the mobile terminal 30. However, rather than using that selected coding rate (as would happen conventionally), the present invention corrects the selected coding rate as a function of grant loss.

Particularly, CR compensator 602 determines a coding rate correction factor as a function of receiving grant loss (erasure) information and outputs a corrected coding rate, as a "final" coding rate selection for use on the downlink control channel. As in the signal quality estimate correction of FIG. 5, the coding rate correction of FIG. 6 can be understood as biasing coding rate selection toward more robust coding, when the incidence of grant loss is higher.

Broadly, then, in at least one embodiment, the controller(s) 22 include a link adaptation controller 26 that is configured to control link adaptation of the downlink control channel by dynamically selecting a coding rate or a transmit power, or both, of the downlink control channel according to a corrected coding rate value maintained for a given mobile terminal 30. Further, the link adaptation controller 26 maintains the corrected coding rate value based on channel quality feedback from the mobile terminal 30, and a correction factor that the link adaptation controller 26 adjusts upward or downward, in dependence on whether any given scheduling grant is lost.

Additionally, or alternatively, the controller(s) 22 include a HARQ controller 28—see FIG. 2—that controls HARQ redundancy version settings as a function of grant loss. For example, in the case that a given transmitted scheduling grant is a downlink scheduling grant for an initial transmission and is determined to be lost, the HARQ controller 28 is configured to control the HARQ redundancy version settings by sending another downlink scheduling grant for re-transmission (keeping the same new data indicator (NDI) as the previous downlink scheduling grant) to the involved mobile terminal 30 and resetting or reinitializing the HARQ redundancy version (RV) to 0. This means that the base station 30 will resend the scheduled downlink transmission—which was not received by the mobile terminal 30, owing to the lost downlink scheduling grant—using the reinitialized HARQ RV value. More broadly, when the base station 10 detects a downlink scheduling grant loss, it sends another downlink scheduling grant to reschedule the "lost" downlink transmission corresponding to the lost grant, and resends the rescheduled downlink transmission using the same HARQ RV value that was used for the lost downlink transmission.

Further, in the case that a given transmitted scheduling grant is an uplink scheduling grant for an initial transmission and is determined to be lost, the HARQ controller 28 is configured to control the HARQ redundancy version settings by sending a new uplink scheduling grant to the involved mobile terminal 30. In this manner, the base station 10 insures that the mobile terminal 30 responds to the new uplink scheduling grant using a reinitialized redundancy version value.

Of course, it is contemplated for at least one embodiment of the present invention that the one or more controllers 22 implement both link adaptation and HARQ control, responsive to determinations of grant loss. However, whether the base station 10 performs link adaptation, or HARQ control, or both, responsive to grant loss depends on the needs or desires associated with the given application, and, possibly, on the type of network in which the base station 10 is configured to operate. In some types of networks, the base station 10 may comprise a Base Transceiver Station (BTS) in combination with a co-located or separate Radio Network Controller (RNC) or Base Station Controller (BSC). Further, the base station 10 may comprise an access point or other transceiver node in an IEEE 802.16 network ("Wimax"). As another example already noted, the base station 10 comprises an eNodeB in an LTE network. Such eNodeBs are also referred to as eNBs.

In at least one LTE embodiment, the base station 10 detects the loss of scheduling grants transmitted to mobile terminals 30 over the Physical Downlink Control Channel (PDCCH). For example, the base station 10 considers an erasure to have occurred if it detects low received signal energy on Physical Uplink Shared Channel (PUSCH) resources that correspond to a scheduled uplink transmission that should have been made by a given mobile terminal 30. Similarly, the base station 10 considers an erasure to have occurred if it detects low received signal energy on Physical Uplink Control Channel (PUCCH) or PUSCH resources that are expected to contain acknowledgment information (ACK/NACK signaling) corresponding to a scheduled downlink transmission from the base station 10.

In more detail, detection of grant loss in the LTE context depends on several assumptions: (1) the base station physical layer is able to determine if a PUSCH transmission is an erasure; (2) the base station physical layer is able to determine if an acknowledgement sent over the PUCCH is an erasure; and (3) the base station physical layer is able to determine if an acknowledgement sent over the PUSCH is an erasure. In this regard, in contrast to the normal acknowledgement operation where two (2) states are defined, (i.e., ACK or NACK), a base station 10 as provided for herein is configured to detect, recognize, and respond to three states (i.e., ACK, NACK, and ERASURE).

Erasure is defined as a state where no ACK or NACK has been sent. For example, an erasure detection can be based on the amount of signal energy received over the acknowledgement channel. In this regard, it will be understood that it is possible that the mobile terminal 30 actually sent an ACK or a NACK, and that reception conditions at the base station 10 prevent detection of that signaling. However, the detection of an erasure by the base station 10 is logically presumed to mean that the mobile terminal 30 did not send acknowledgment information. That presumption in turn leads to the logical presumption that the mobile terminal 30 did not send that information because it did not receive the corresponding downlink scheduling grant. In other words, ACK/NACK erasure is presumed to indicate the loss of a downlink scheduling grant.

Put simply, if a downlink (DL) grant is sent over PDCCH and the base station 10 detects an erasure corresponding to the acknowledgement over PUCCH or PUSCH, the DL grant is assumed lost. Otherwise, the DL grant is recognized as being received successfully.

As for detecting the loss of uplink scheduling grants, two algorithms are contemplated. In one approach, an uplink (UL) grant is sent over PDCCH. Then, if the base station 10 detects an erasure corresponding to the PUSCH transmission the UL grant is assumed lost. Otherwise, the UL grant is recognized as being successfully received by the mobile terminal 30. Alternatively, an UL grant is assumed lost if the base station 10 detects an erasure corresponding to the PUSCH transmission and also experiences a CRC failure for the UL transmission. Otherwise, the UL grant is deemed as having been received successfully by the mobile terminal 30.

Of course, there is some finite probability that the above lost-grant determination algorithms reach the wrong conclusion about whether a given grant is lost. For example, if the base station 10 detects an erasure corresponding to a PUSCH transmission, it may be due to bad UL channel conditions instead of the loss of the corresponding UL grant. Similarly, the base station 10 may detect an erasure corresponding to an acknowledgement over PUCCH or PUSCH because of bad UL channel conditions.

However, there is a small probability of falsely detecting grant loss, based on the erasure detection teachings described herein. At worst, the possibility of bad conditions interfering with UL transmissions from the mobile terminal 30 only slightly biases the detection of grant loss. Grant loss detection therefore serves as a reliable driver of link adaptation and/or HARQ control.

Using link adaptation as a particular example, the knowledge of grant loss can be used to perform "outer loop" control of the coding rate for the PDCCH. In more detail, the number of Control Channel Elements (CCEs) used to carry a PDCCH message (or the coding rate of PDCCH) can be determined through lookup tables or other data structures, stored in memory accessed by corresponding processing elements within the base station 10. In at least one such embodiment, for each specific Downlink Control Information (DCI) format used for DCI messages (including grants), the base station 10 may store a different table, for mapping estimated PDCCH SINR to a certain number of CCEs and a given value of EPRE.

FIG. 7 illustrates a non-limiting example of a lookup table 700, stored in memory 702. The base station 10 of FIG. 2 may, for example, include such memory within the illustrated control and processing circuitry 18. In that regard, it will be understood that those circuits comprise fixed or programmable processing circuits, or both. For example, in at least one embodiment the control and processing circuitry 18 comprise one or more microprocessor-based circuits, or other computer-based circuitry, the configuration of which is at least partly defined by the execution of stored computer program instructions. Thus, the top-level method of FIG. 1, and the various processing embodiments shown in FIGS. 3-6, for example, may be at least partially implemented, based on the execution of computer program instructions stored in a memory or other computer-readable medium that is contained within or is otherwise accessible to the base station 10.

Turning back to FIG. 7, table 700 defines a number of SINR thresholds (A1, . . . , A5), against which the corrected SINR (of a given mobile terminal 30) is compared. The range into which the corrected SINR falls determines the coding rate and power used for transmitting to the mobile terminal 30 on the downlink control channel, according to the disclosed table mappings.

As a non-limiting example, the base station 10 implements the following algorithm:

```
if a DL/UL grant is lost, then
    Δ_PDCCH_SINR = Δ_PDCCH_SINR − Down_Step
Else if a DL/UL grant is received successfully
    Δ_PDCCH_SINR = Δ_PDCCH_SINR + Up_Step
End
```

Where $\Delta_{PDCCH\_SINR}$ is the correction term applied to the raw PDCCH SINR, to obtain the final PDCCH SINR used as a control value by the outer loop.

In one embodiment, the correction term is initialized to zero and is accumulated over the duration of the mobile's RRC connection. Further, the Down_Step and Up_Step adjustment values can be static or dynamic values. In at least one embodiment, the adjustment values are configuration parameters. Further, in at least one embodiment, the adjustment values are optimized through simulations and/or live air testing. More broadly, in at least one embodiment, the base station 10 is configured to adapt the adjustment values over time, based on maintaining one or more metrics that assess the accuracy of grant loss determinations, or that are otherwise driven by control effects associated with grant loss determinations.

In any case, one sees that the final PDCCH SINR=estimated PDCCH SINR++$\Delta_{PDCCH\_SINR}$. Correspondingly, that final PDCCH SINR and the mapping table for a specific DCI format are used to determine the number of CCEs to be used for the given DCI format and for setting the EPRE of the CCEs. And, as noted, both PDSCH SINR and PDCCH SINR may be estimated based on CQI feedback from the mobile terminal 30.

Advantageously, with this arrangement, the outer loop corrections for PDCCH SINR are based on the successful (or unsuccessful) transmissions over PDCCH instead of PDSCH, meaning that the control loop for PDCCH is driven by feedback directly related to PDCCH channel conditions. Also, as indicated before, because the grant loss detection algorithm is slightly biased by the possibility of false erasure event detection, the corrected PDCCH SINR tends to be lower than it would be without erasure detection errors, which means more CCEs may be used to send DL/UL grants. However, the two parameters, Down_Step and Up_Step, can be tuned to offset this bias.

Further, FIG. 6 introduced a direct, coding-rate based mapping as an alternative to the SINR mapping of FIG. 5 (and table 700). Correspondingly, FIG. 8 illustrates an example of a direct CR-based mapping table 800, stored in a memory 802 within the base station 10. (Memory 800 may be the same or different than memory 702.) The table 800 provides for direct adjustment of the PDCCH coding rate.

With this approach, the reported CQI is first mapped to a coding rate (CR), where that initial or raw coding rate is set by the outer loop. The final coding rate is obtained by correcting the raw coding rate, and it is then mapped to a number of CCEs and an EPRE through lookup table 800. Again, there may be one lookup table 800 for each specific DCI format, and it will be understood that R1, . . . , R5 in table 800 represent different coding rate values, such that table 800 defines ranges of coding rates, with each range mapped to particular CCE and EPRE settings.

According to an example direct coding-rate implementation:

If a DL/UL grant is lost
   $\Delta_{PDCCH\_CR} = \Delta_{PDCCH\_CR} \cdot CR\_Down\_Factor$
Else if a DL/UL grant is received successfully
   $\Delta_{PDCCH\_CR} = \Delta_{PDCCH\_CR} \cdot CR\_Up\_Factor$
End Where $\Delta_{PDCCH\_CR}$ is the correction term for PDCCH CR (coding rate), which may be initialized to one and accumulated (or otherwise adjusted) over the duration of RRC connection. As before, the CR_Down_Factor and CR_Up_Factor can be configuration parameters and they can be optimized through simulations and/or live operation. In any case, The final CR=(CQI mapped CR)($\Delta_{PDCCH\_CR}$). With the final CR, the number of CCEs and EPRE are obtained by using table 800 (which may be specific to the specific DCI format at issue).

Whether direct-CR mapping or SINR-based mapping is used, it will be appreciated that the correction factor(s) used to obtain the final control value for such mapping are, in one or more embodiments, "live" values that are dynamically maintained by the base station 10, based on monitoring or otherwise tracking the incidence of grant loss. In at least one such embodiment, a higher incidence of grant loss drives the correction values in a direction that results in more robust coding and/or higher power on the downlink control channel. Such processing may be carried out for any number of mobile terminals 30.

Of course, as noted previously, HARQ redundancy version control may be driven by grant loss determinations, in addition to, or as an alternative to, link adaptation. In particular, if a lost grant is for an initial transmission, special attention should be paid to selection of the HARQ redundancy version (RV) for the next HARQ transmission. In one embodiment of the base station 10, if a DL/UL grant for initial transmission is lost, the base station 10 is configured to: (1) send a DL/UL grant for the next HARQ transmission; (2) set RV for that next transmission to the value in the original grant; and (3) treat that new transmission as an initial transmission.

In LTE, an UL grant for PUSCH HARQ retransmission is not required if the same resource blocks are used. However, when the UL grant for an initial transmission is lost, the base station 10 is configured to send another UL grant, to trigger an initial transmission by the mobile terminal 30 (with a reinitialized HARQ redundancy version). For the DL, a grant has to be sent for every HARQ transmission, including retransmissions.

To understand the advantages gained from resetting the HARQ redundancy version, it should be appreciated that an initial transmission according to HARQ processing includes all systematic bits, whereas other redundancy versions used for any subsequent retransmissions may not contain all systematic bits. Without all systematic bits, the transport block cannot be successfully decoded, even if the later redundancy versions are successfully received. Thus, absent the HARQ redundancy version resetting taught herein, multiple HARQ retransmissions can be wasted, which can lead to significant inefficiency in the wireless network.

By reinitializing the HARQ redundancy version responsive to grant loss detection, the present invention avoids wasted HARQ retransmissions and, therefore, wasted scheduling resources. Put simply, when initial transmission grant is lost, retransmitting the initial redundancy version can deliver the user data earlier than would otherwise occur using conventional approaches. This translates to shorter delays and/or higher system throughput. Similarly, efficiency and/or throughput advantages are gained by biasing or otherwise adjusting the downlink control channel's outer loop control algorithm, in response to grant loss detection. In particular, such algorithms control the coding rate and/or transmit power of the downlink control channel, e.g., the PDCCH in LTE. And, according to the teachings herein, that control is improved because the transmission success or failure of scheduling grants sent over the downlink control channel is used. Because that control mechanism is directly tied to the actual channel conditions experienced for the downlink control channel, such control results in better selection of coding rate and transmit power, as compared to using PDSCH feedback, for example. This better control leads to more efficient resource usage.

A number of mechanisms are contemplated herein for grant loss determination based on erasure event detection. For example, for UL grant loss detection, when an eNodeB transmits an UL grant message, but does not detect the expected UL data transmission, it is assumed that the UL grant is lost. In general, the erasure detection of the UL data transmission is based on the received data signal energy. For LTE, erasure detection for an expected PUSCH data transmission can be based on a simple approach that uses the Demodulation Reference Signal (DMRS). In particular, because DMRS is always transmitted with user data, the presence of DMRS indicates the presence of data transmission. Thus, an eNodeB can be configured to monitor for the loss of an UL grant by performing erasure detection on DMRS.

An example approach is shown in the method 900 of FIG. 9. During the time period for DMRS symbol reception, Discrete Fourier Transform (DFT) processing (Block 904) is performed on the received signal after removing the Cyclic Prefix (CP) (Block 902) to obtain the DMRS in frequency domain. Because the DMRS sequence in frequency domain is known by the eNodeB, each received DMRS sequence element is multiplied by the conjugate of the corresponding transmitted element (Blocks 906 and 908).

An over-sampling step (Block 910) may be used, such as by sequence repeating and zero padding. Such over-sampling techniques can be used to reduce edge distortion and interference. After any such oversampling, the resulting frequency domain signal is converted back to time domain by performing an Inverse DFT (IDFT) (Block 912), and time domain filtering is used to remove noise and interference caused by signals from other UEs (Block 914).

Processing then continues with finding the magnitude of the strongest peak of the filtered signal, as an indication of the signal power (Block 916). Because two OFDM (Orthogonal Frequency Division Multiplexing) symbols are used to transmit DMRS for each PUSCH transmission, the sum of the strongest peaks for the two DMRS symbols should be used as an indication of the signal power (Block 918). In the case of multiple receive antennas, the summation should be performed across all antennas. If the (summed) signal power is below a defined threshold (Block 920), it will be regarded as an erasure (Block 922). That is, if the signal power falls below the threshold value, which may be predefined or dynamically determined, the eNodeB will conclude that no PUSCH transmission was received.

As for DL grant loss detection, when an eNodeB transmits a DL grant message, but does not detect the expected acknowledgement from the UE corresponding to the DL data transmission, it is assumed that the DL grant is lost. The acknowledgement expected from the UE can be transmitted by the UE over PUCCH or PUSCH.

When Ack/Nack is expected to be sent on PUCCH, the Ack/Nack erasure detection can be performed on DMRS of PUCCH or on the acknowledgement signal itself. First, consider Ack/Nack erasure detection based on PUCCH DMRS. The PUCCH is used to transmit Scheduling Requests (SRs), Ack/Nacks, and CQI/PMI/RI (Channel Quality Indicator/Precoding Matrix Indicator/Rank Indicator). Each such type of information has a specific resource index. The resource index is used to determine the cyclic shift of a base sequence, and an orthogonal sequence in some cases. Further, Ack/Nack signaling responsive to DL transmissions in LTE can be transmitted over the PUCCH in different formats, denoted as formats 1a, 1b, 2a and 2b.

For 1a/1b formats, the PUCCH DMRS is transmitted in multiple OFDM symbols in a slot (there are two slots in each subframe). A PUCCH resource block for format 1a/1b and normal Cyclic Prefix (CP) is shown in FIG. 10.

The orthogonal sequence mentioned above is used to create multiple versions of the base sequence (one version of the base sequence is generated by multiplying the base sequence by a sequence element of the orthogonal sequence). In each OFDM symbol reserved for DMRS, a version of the base sequence is transmitted (one sequence element on each subcarrier).

Figure 11:
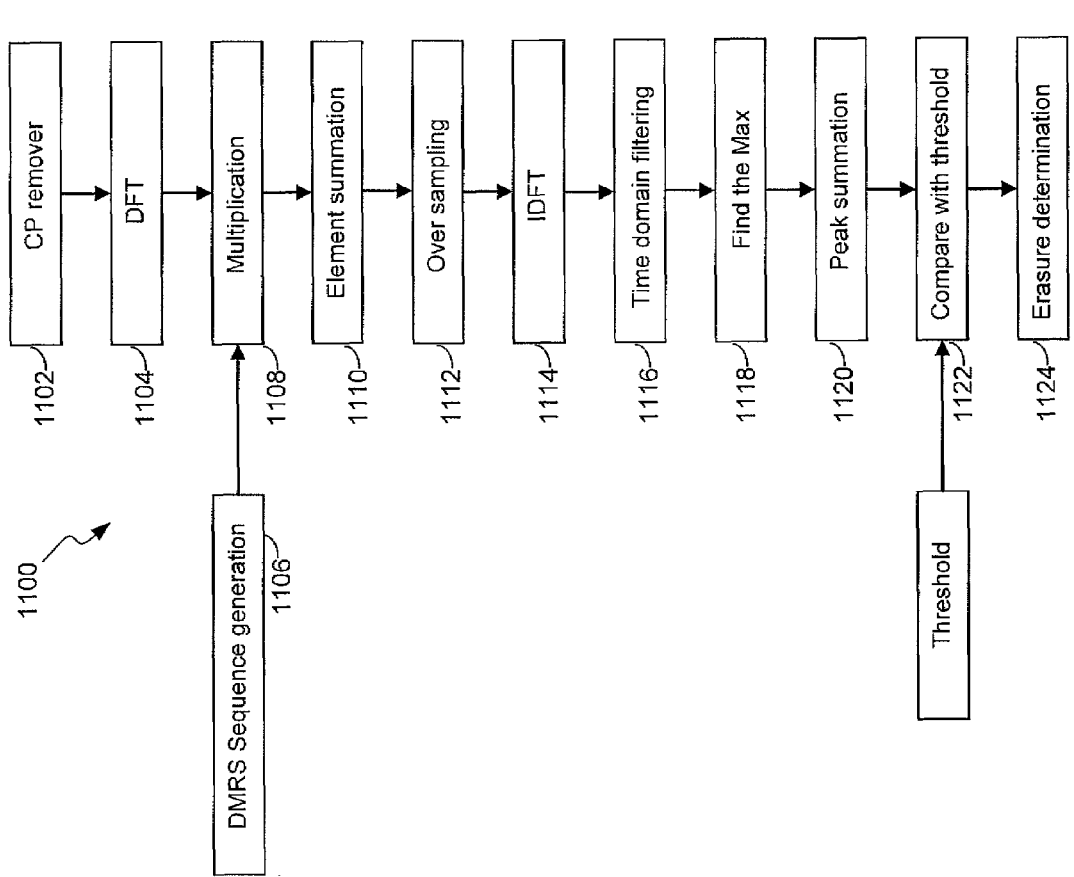
FIG. 11 is a logic flow diagram illustrating an example algorithm for PUCCH DMRS detection.

One algorithm to detect PUCCH DMRS in this case is described as follows and shown in the method 1100 of FIG. 11. According to this example processing, after removing the CP (Block 1102), a DFT is performed in each DMRS symbol time (Block 1104), to derive the received base sequence. Each received base sequence element is multiplied by the conjugate of the corresponding transmitted base sequence element (Block 1108). The products over all OFDM symbols in a slot where DMRS is transmitted are added for each subcarrier (Block 1110). This summation results in a sequence in the frequency domain. Oversampling is optionally applied (Block 1112), and an IDFT is performed on the (oversampled) sequence of summation (Block 1114), followed by time-domain filtering (Block 1116).

The processing after this point is similar to that described for UL grant loss detection, as depicted in FIG. 9. A strongest peak is identified in each slot (Block 1118) and the sum of the magnitudes of two peaks in two slots is used for erasure detection (Blocks 120, 122, and 124). In the case of multiple receive antennas, the summation should be performed across all antennas. Similar procedures can be used to detect Ack/Nack instead of DMRS.

One point to note, however, is that, when Ack/Nack and SR are transmitted in the same subframe, the SR resource index is used to select the cyclic shift of the base sequence and the orthogonal sequence. When DMRS based on the SR resource index is detected in a subframe in which eNodeB expects both Ack/Nack and SR, it may not be possible to definitively conclude that an Ack/Nack is indeed transmitted. That is, even if Ack/Nack is not transmitted because the DL grant was lost, DMRS based on SR resource index will be detected as long as SR is transmitted. This detection issue cannot be completely eliminated even if the eNodeB is configured to decode the control information itself, instead of detecting DMRS, because the modulation symbol for SR is the same as that for 1-bit Nack or 2-bit Nack-Nack, which is 1. In other words, when the eNodeB expects both SR and Ack/Nack, and the received symbol on the SR resource is 1, the eNB does not know whether the Ack/Nack was transmitted. However, when the eNB expects both SR and Ack/Nack, and the received symbol on SR resource is not 1, the eNB can reliably determine that the Ack/Nack was indeed transmitted.

Figure 12:
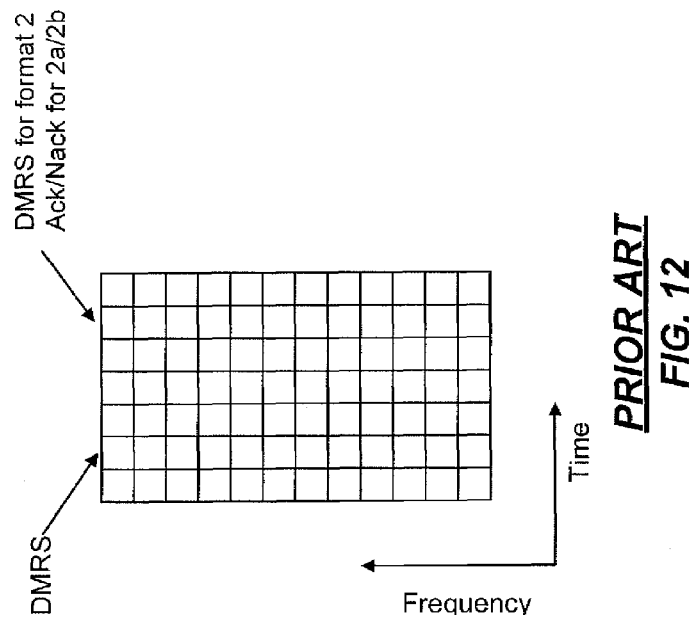
FIG. 12 is a diagram of a known structure for a PUCCH resource block in LTE, for PUCCH formats 2/2a/2b and a normal Cyclic Prefix (CP).

For formats 2a/2b, the PUCCH DMRS is transmitted on two OFDM symbols in a slot (there are two slots in each subframe), but one symbol is actually used to carry the Ack/Nack information (see FIG. 12). Thus, orthogonal sequences are not needed. In this case, the processing of DMRS detection is similar to that used for UL grant loss detection. The same processing can also be used to detect Ack/Nack. Here, however, blind detection is used, because the eNodeB does not know whether Ack or Nack is transmitted.

Also, as described above, there are instances when Ack/Nack receipt (or lack thereof) is difficult to definitively determine. For example, when Ack/Nack and CQI/PMI/RI are transmitted in the same subframe, the CQI/PMI/RI resource index is used to select the cyclic shift of the base sequence. When DMRS based on the CQI/PMI/RI resource index is detected in a subframe in which eNB expects both Ack/Nack and CQI/PMI/RI, the eNodeB cannot definitively conclude that an Ack/Nack was transmitted. That is, even if the UE did not transmit an Ack/Nack (because the DL grant was lost), the DMRS, as based on CQI/PMI/RI resource index, will be detected as long as CQI/PMI/RI is transmitted.

Further, as was noted for format 1a/1b, when the eNodeB expects both CQI/PMI/RI and Ack/Nack, and the modulation symbol carried by the second DMRS symbol is 1, it is difficult for the eNodeB to determine whether the Ack/Nack was transmitted. However, when eNB expects both CQI/PMI/RI and Ack/Nack, and the modulation symbol carried by the second DMRS symbol is not 1, the eNodeB can conclude that Ack/Nack was transmitted.

In cases where the presence of other control information makes Ack/Nack erasure detection difficult, the eNodeB can be configured such that it assumes the Ack/Nack was transmitted. (Such an assumption may, of course, be wrong in given instances, but the overall control algorithms presented herein are tolerant of these types of incidental errors.) Alternatively, the eNodeB may be configured not to assume that the Ack/Nack was transmitted.

Figure 13:
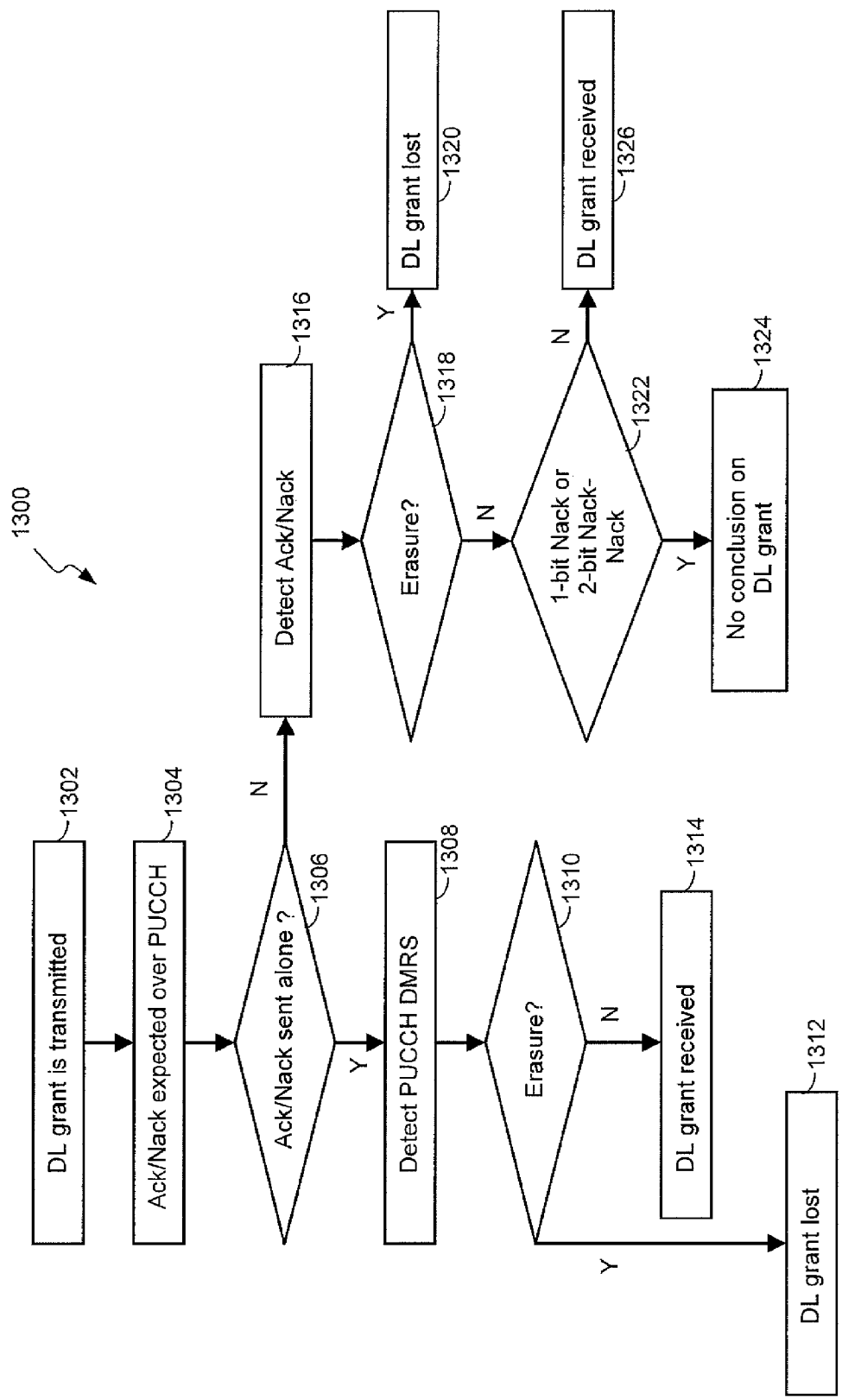
FIGS. 13-15 are logic flow diagrams illustrating example algorithms of decreasing complexity, for downlink grant loss detection.

Instead, as a first example, the eNode implements the algorithm depicted as method 1300 in FIG. 13. According to that algorithm, a DL grant is transmitted (Block 1302), and the eNodeB correspondingly expects to receive an Ack/Nack transmission from the targeted UE over the PUCCH (Block 1304).

If the Ack/Nack is not sent simultaneously with SR or CQI/PMI/RI (Yes from Block 1306), the eNodeB performs erasure detection on DMRS (Block 1308). If erasure is detected (Yes from Block 1310), the DL grant is deemed to have been lost (Block 1312). Conversely, if erasure is not detected (No from Block 1310), the DL grant is deemed to have been received (Block 1314).

However, if the Ack/Nack was sent simultaneously with SR or CQI/PMI/RI (No from Block 1306), the eNodeB performs Ack/Nack detection (Block 1316). If erasure is detected (Yes from Block 1318), the DL grant is deemed as lost (Block 1320). On the other hand, if erasure is not detected at Block 1318, processing continues with determining whether a 1-bit Nack or 2-bit Nack-Nack is detected (Block 1322). If so, no conclusion on DL grant reception is reached (Block 1324); otherwise, the DL grant is deemed to have been received (Block 1326).

Figure 14:
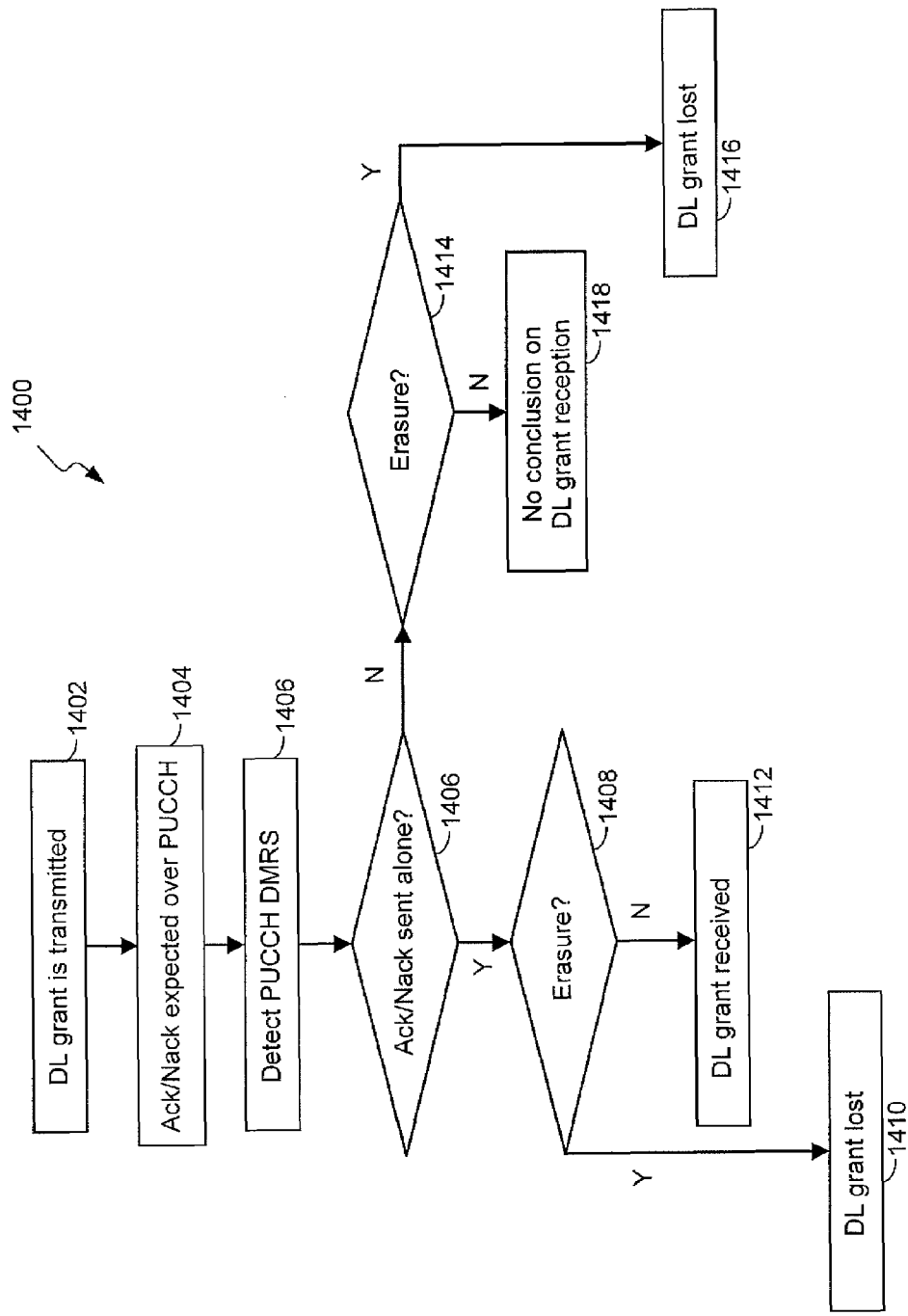

FIG. 14 illustrates a simplified alternative to the above algorithm. Again, the algorithm begins with a DL grant being transmitted by the eNodeB to a targeted UE (Block 1402), with the corresponding expectation that the UE will send an Ack/Nack over the PUCCH (in response to receiving the scheduled downlink transmission) (Block 1404).

Thus, the eNodeB performs erasure detection on DMRS (Block 1406). If the Ack/Nack is sent alone, i.e., not sent simultaneously with SR or CQI/PMI/RI, then processing continues (Yes from Block 1406) with detecting whether an erasure occurred. If erasure is detected (Yes from Block 1408), then the DL grant is deemed to have been lost (Block 1410); otherwise, the DL grant is deemed not to have been lost (Block 1412). If the Ack/Nack was not sent alone (No from Block 1406) and erasure is detected (Yes from Block 1414), then the DL grant is deemed lost (Block 1416). Otherwise, if erasure is not detected (No from Block 1414), then no conclusion is made regarding DL grant loss (Block 1418).

Figure 15:
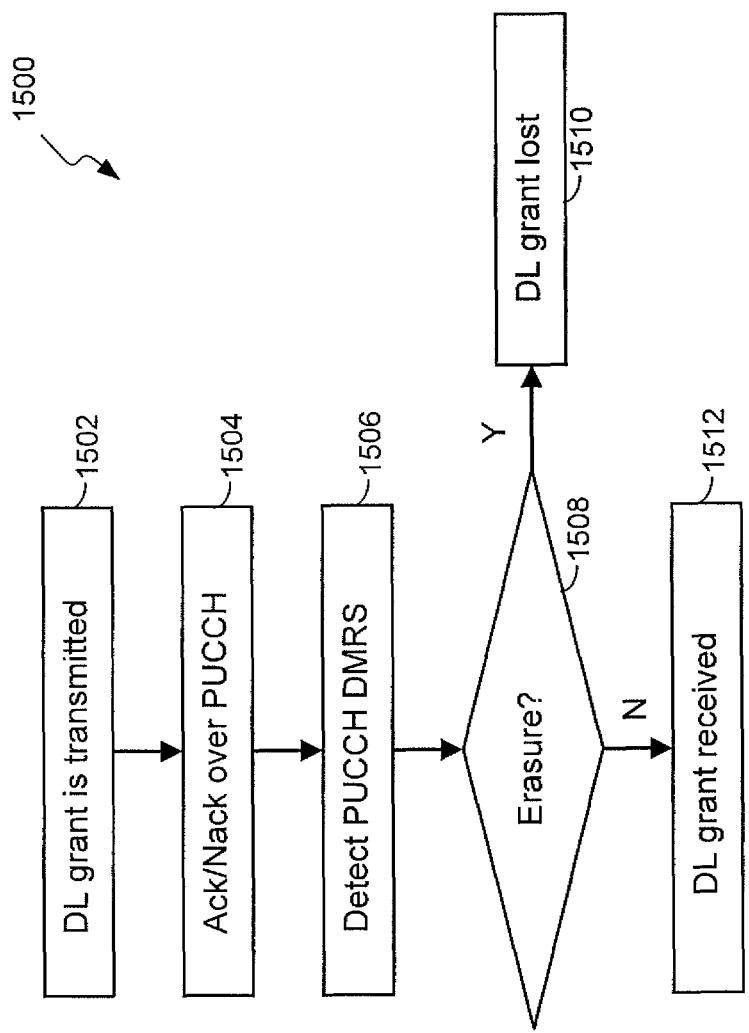

FIG. 15 depicts an even simpler alternative method 1500. Again, it is assumed that the eNodeB has transmitted a DL grant (Block 1502) and Ack/Nack signaling by the UE is expected over the PUCCH in conjunction with the UE's receipt of the scheduled downlink transmission (Block 1504) In this embodiment, the eNodeB is configured to perform erasure detection on DMRS (Block 1506) and, if erasure is detected (Yes from Block 1508), to deem the DL grant as lost (Block 1510). Otherwise, the eNodeB deems the DL grant to have been received (not lost) (Block 1512).

In cases where the Ack/Nack signaling is expected on the PUSCH, the acknowledgement signaling itself generally can be used for erasure detection. In the demodulator/decoder for Ack/Nack, some form of energy or power of the Ack/Nack signal can be measured and used for erasure detection. If the energy or power is less than a defined threshold, it is considered as an erasure. Those skilled in the art will appreciate that such processing may include blind detection, because the eNodeB generally does not know whether the acknowledgement is positive (Ack) or negative (Nack). (In the case of 2-bit Ack/Nack signaling, there are four possible combinations: Ack-Ack, Ack-Nack, Nack-Ack and Nack-Nack). Correspondingly, in at least one embodiment contemplated herein, the eNodeB is configured to perform erasure detection for all possible cases. It is considered to be an erasure only when erasure is detected for all possible cases.

Figure 16:
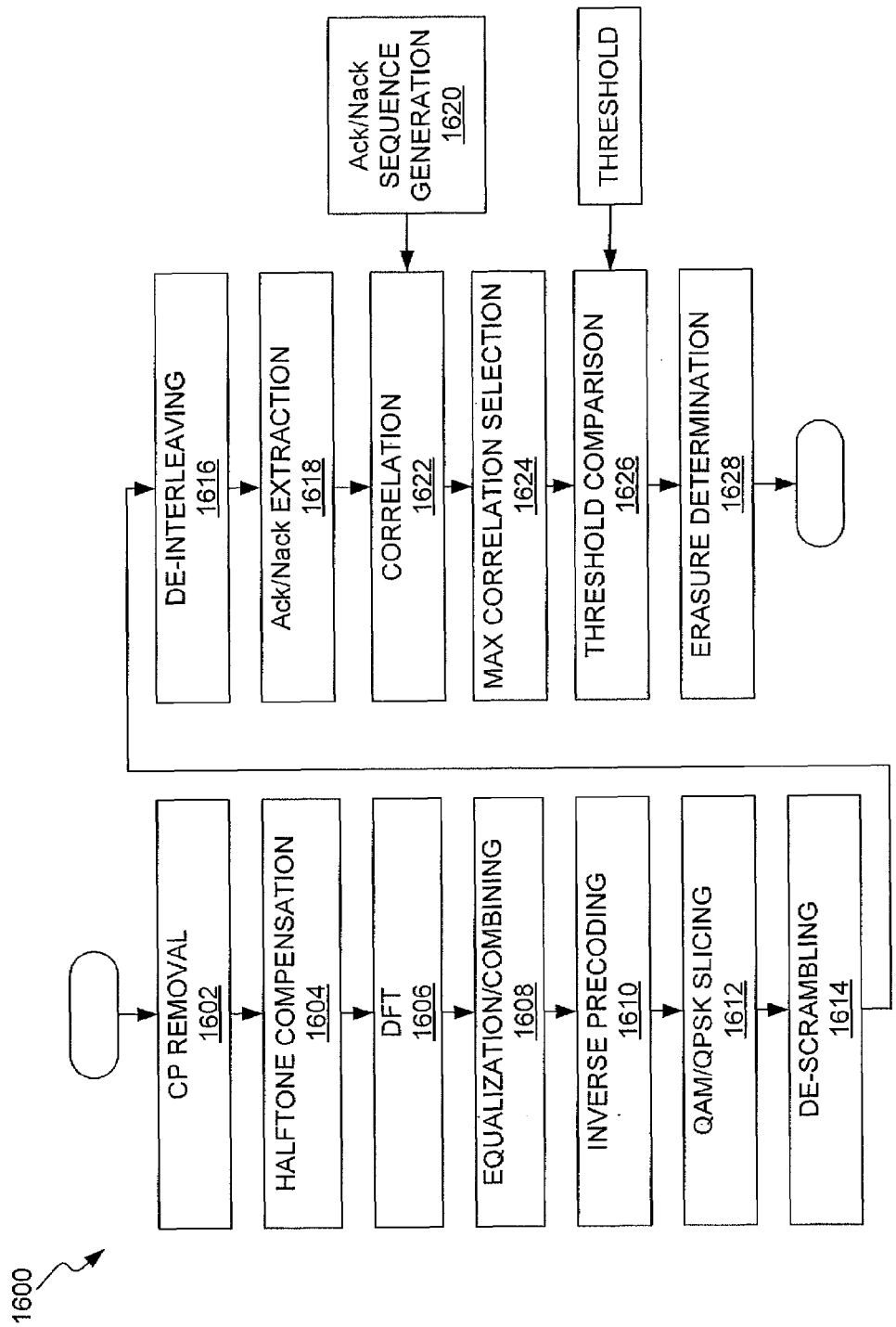
FIG. 16 is a logic flow diagram illustrating an example algorithm for downlink grant loss detection, in cases where Ack/Nack signaling is expected on the PUSCH.

One LTE implementation is shown in FIG. 16. In the context of FIG. 16, it may be helpful to note that there are multiple symbols in one subframe, and that some of the operations are performed on a per-symbol basis, while others are performed on a per-subframe basis. Where helpful for clarity, such distinctions are noted in the below processing description.

According to the illustrated method 1600, the Cyclic Prefix (CP) is removed from the time domain signal during each OFDM symbol (Block 1602) and halftone frequency compensation is performed to remove the frequency shift introduced by the transmitter (Block 1604). A DFT is then performed (Block 1604), along with equalization/combining (Block 1608). That is, equalization is performed on the signal from each receive antenna, and these equalized signals are combined, in the case of multiple receive antennas. Further, because SC (Single Carrier)-FDMA is used for LTE uplink, inverse precoding is used to derive the modulation symbols in each subframe (Block 1610). Then, QAM/QPSK slicing (Block 1612), de-scrambling (Block 1614) and de-interleaving (Block 1616), are performed on a subframe basis to obtain coded user data and control information, including Ack/Nack extraction (Block 1618).

The coded Ack/Nack is extracted as a sequence, and the eNodeB also generates the transmitted Ack/Nack sequences—i.e., it generates the known possible Ack/Nack sequences (Block 1620). Because the eNodeB does not know whether an Ack or a Nack has been received from the UE, it generates sequences for all possible cases. For 1-bit Ack/Nack, there are two possible sequences: one for Ack and one for Nack. For 2-bit Ack/Nack, there are four possible sequences: Ack-Ack, Ack-Nack, Nack-Ack and Nack-Nack.

The generated sequences are correlated with the received sequence (before doing correlation, bit 0 is replaced with −1) (Block 1622). The maximum correlation is selected and used to determine whether an erasure has occurred (Blocks 1624, 1626, and 1628). That is, if the maximum correlation value is less than a defined threshold value, the eNodeB considers an erasure to have occurred.

In another advantageous aspect of the present invention, an eNodeB or other base station is configured to reduce or eliminate misdetection of grant loss, at least under certain circumstances. For example, misdetection can occur when the eNodeB expects Ack/Nack over PUSCH and therefore attempts Ack/Nack detection only on the PUSCH. As an example, in cases where the eNodeB sends both UL and DL grants to a targeted UE in a certain time order, the UE will send its Ack/Nack signaling for the scheduled DL transmission on the PUSCH, rather than the PUCCH (assuming both grants are successfully received at the UE).

However, the UE might successfully receive the DL grant but miss the UL grant, in which case the UE will send Ack/Nack signaling for the scheduled downlink transmission on the PUCCH, and not on the PUSCH. That is, if the UL grant for the PUSCH transmission is lost, the targeted UE will transmit Ack/Nack over PUCCH (as it would have done had no UL grant been transmitted to it) and the eNodeB therefore would miss the Ack/Nack signaling on the PUCCH if it is looking for that signaling only on the PUSCH. Thus, in at least one embodiment, the eNodeB is configured to look for Ack/Nack signaling on the PUCCH, even when such signaling is expected on the PUSCH. In such embodiments, when the eNodeB expects to see Ack/Nack over PUSCH, but detects Ack/Nack on PUCCH, it deems the DL grant not to have been lost, but deems the UL grant to have been lost.

An alternative method is to use PUSCH DMRS instead of the acknowledgement signaling. Then the procedures will be the same as those described above for UL grant loss detection. With this approach, false detection can occur in addition to misdetection. False detection occurs when a UE transmits PUSCH based on a received UL grant but does not include Ack/Nack in its PUSCH transmission, because the DL grant was lost. In this case, the presence of DMRS in the uplink signaling does not indicate the presence of Ack/Nack.

However, it is expected that the probabilities of false detection and misdetection are small and that the control processing set forth herein is well tolerant of such errors. Because the DL grant transmission time is quite close to the UL grant transmission time (at most a few ms apart), it is not expected that the channel condition changes significantly. In fact, for LTE FDD (Frequency Division Duplex) mode without Ack/Nack repetition, the DL and UL grants are transmitted in the same subframe.

Further, there are a number of algorithms that can be usefully applied to the task of detecting whether a DL grant was lost, in cases when the eNodeB expects the Ack/Nack on PUSCH. The particular algorithm(s) chosen also depends on the algorithm(s) implemented to detect DL grant loss when Ack/Nack is expected to be on PUCCH—at least if the elimination of misdetection is desired. Two example algorithms are described below.

Figure 17:
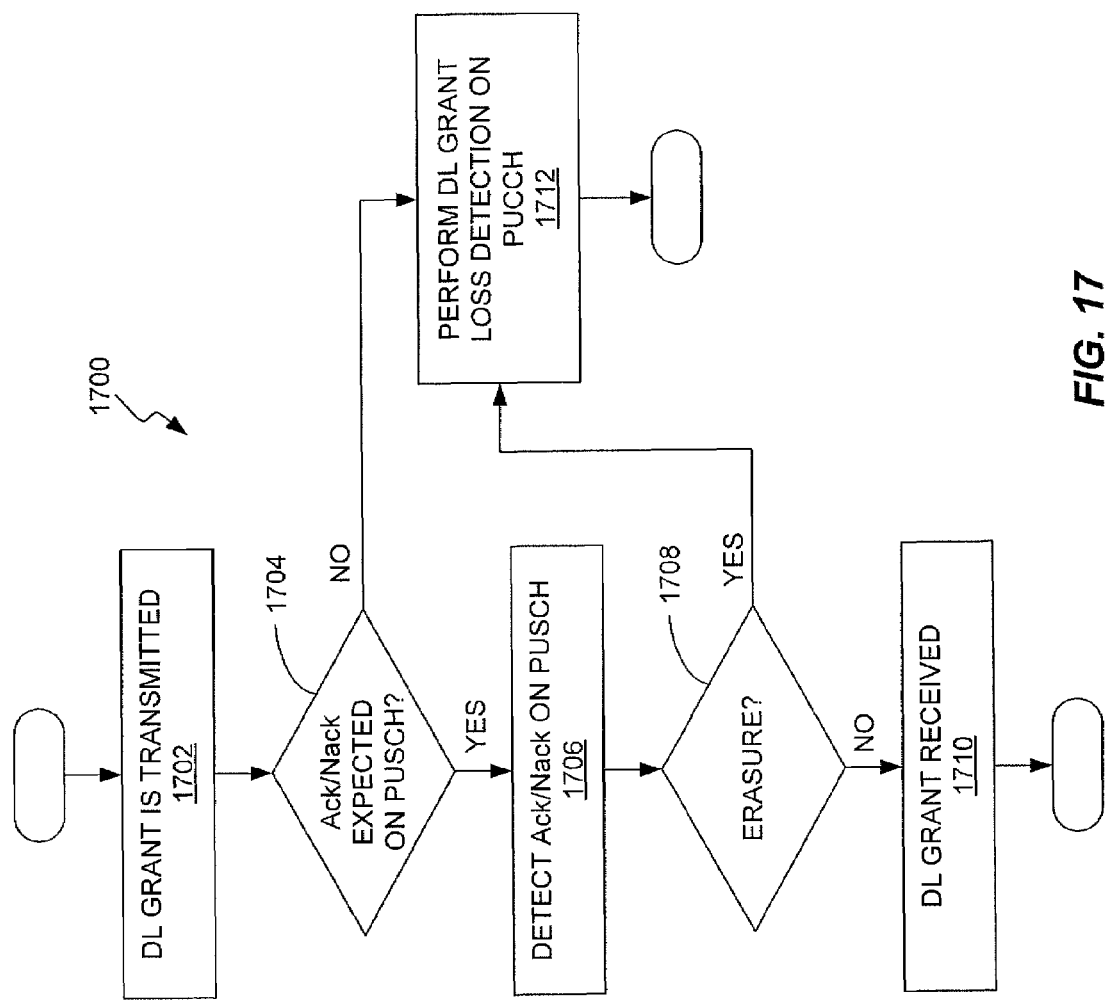
FIGS. 17 and 18 are logic flow diagrams illustrating example algorithms for detecting DL grant loss in cases where the eNodeB expects Ack/Nack signaling on the PUSCH.

FIG. 17 provides a first example method 1700. Here, a DL grant is sent over PDCCH (Block 1702). If the expected Ack/Nack is to be sent over PUSCH (Yes from Block 1704), the eNodeB performs Ack/Nack erasure detection on PUSCH (Block 1706). If erasure is not detected on PUSCH (No from Block 1708), the DL grant is deemed received (Block 1710).

However, as described above, it may be the case that the UE transmits Ack/Nack signaling for the scheduled DL transmission on the PUCCH rather than on the PUSCH (e.g., both UL and DL scheduling grants were sent to the UE, but the UE missed the UL grant). Thus, if the eNodeB detects erasure on the PUSCH (Yes from Block 1708), it also performs DL grant loss detection on the PUCCH (Block 1712). Note that serial step-wise nature of the diagram does not necessarily imply serial processing at the eNodeB—i.e., erasure detection monitoring on the PUSCH and/or PUCCH can be performed in parallel and is driven by the expected timing of the Ack/Nack signaling from the UE.

Of course, if the eNodeB does not expect Ack/Nack signaling on the PUSCH (No from Block 1704), such as in the case where no UL scheduling grant is sent to the UE in conjunction with transmitting the DL scheduling grant, the eNodeB performs DL grant loss detection on the PUCCH (Block 1712). Such detection processing is performed in accordance with the earlier described examples of PUCCH-based DL grant loss detection.

Figure 18:
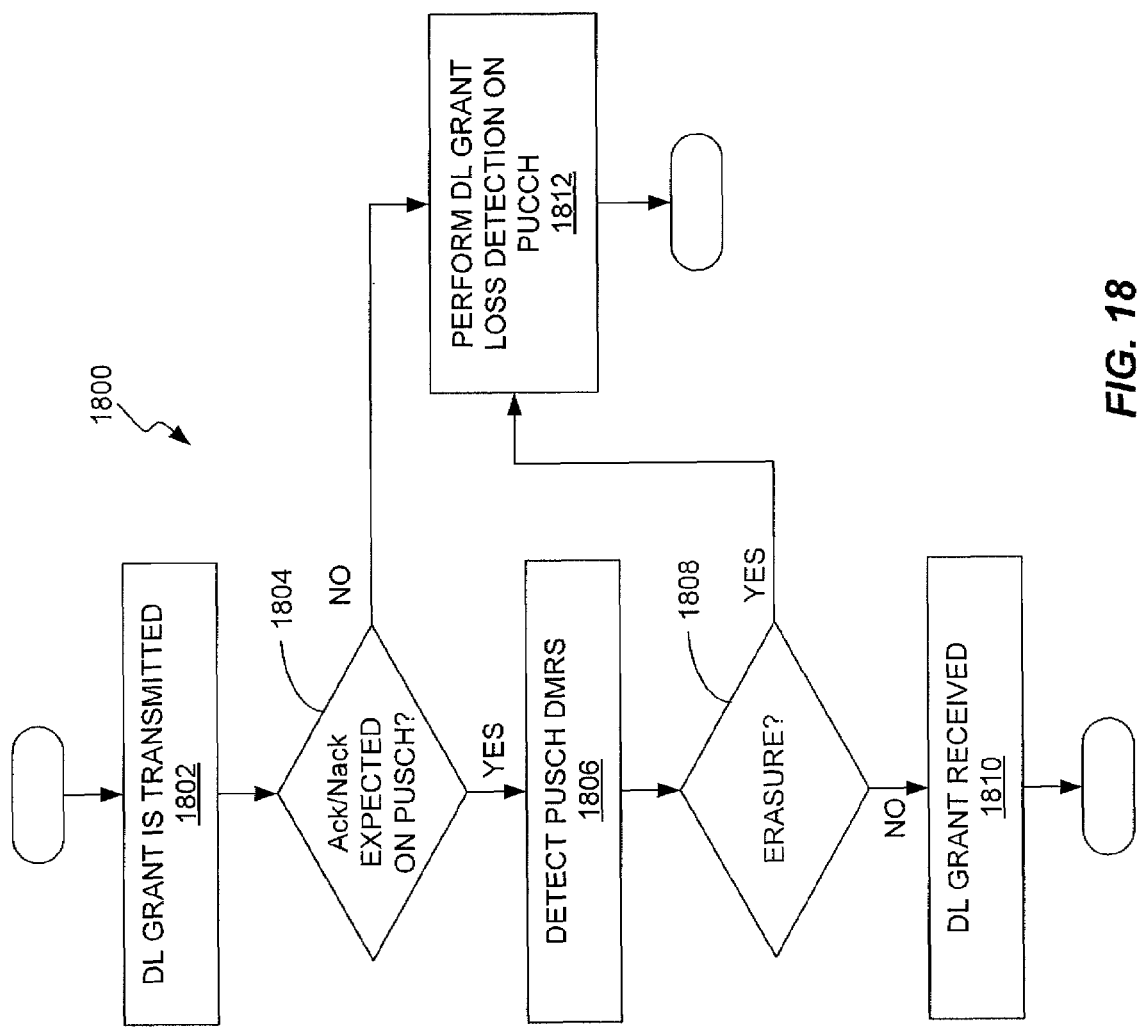

FIG. 18 provides another example of an algorithm (or set of algorithms) to be applied in cases where the detection on PUSCH is based on DMRS rather than the Ack/Nack signal. According to the illustrated method 1800, a DL grant is sent over PDCCH (Block 1802). If the Ack/Nack from the UE is expected on PUSCH (Yes from Block 1804), the eNodeB performs PUSCH DMRS detection (Block 1806). If erasure is not detected on PUSCH (No from Block 1808), the eNodeB considers the DL grant to have been received (Block 1810). Otherwise, if the eNodeB detects an erasure event based on its PUSCH DMRS processing (Yes from Block 1808), it performs DL grant loss detection on PUCCH (Block 1812). Such processing is performed in accordance with the earlier described PUCCH-based grant loss detection.

Further, while an eNodeB according to FIG. 17 (or FIG. 18) may be configured to perform the processing of Block 1712 (or Block 812) serially, only after the PUSCH-based processing and erasure detection of Blocks 1706 and 1708 (or Blocks 1806 and 1808), it should be noted that the processing can performed in parallel, particularly where processing delays are of concern. More generally, those of ordinary skill in the art will recognize that received signal energy measurements or other such processing underlying grant loss detection for PUSCH and PUCCH is performed at the appropriate times (and on the appropriate channel/frequency resources).

Further, in at least one embodiment, if the eNodeB detects grant loss according to the PUSCH DMRS processing of Block 1806 and then detects grant loss according to the PUCCH-based processing of Block 1812, the eNodeB does not deem the DL grant as lost. That it, it deems the DL grant loss detection as inconclusive. In at least one such embodiment, when no conclusion is made, the eNodeB is configured not to perform outer loop adjustment (for this instance of possible grant loss), and does not send an UL grant for re-transmission nor reset the RV value for DL grant re-transmission. More generally, in instances where the eNodeB determines that it can make no definitive conclusion as to whether the grant was or was not lost, it may be configured such that it forgoes taking any processing actions that are driven by the conclusive determination of a grant being lost.

Of course, the advantages described immediately above are merely examples, and other advantages will be recognized by those skilled in the art. More generally, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Finally, although specific terms may be employed herein, they are used in a generic and descriptive sense only and not for purposes of limitation.

What is claimed is:

1. A method at a wireless communication network base station of detecting grant losses for scheduling grants sent over a downlink control channel, said method comprising:
   scheduling transmissions to or from a mobile terminal by transmitting scheduling grants over the downlink control channel to the mobile terminal;
   controlling link adaption of the downlink control channel, or HARQ redundancy version settings for the scheduled transmissions, or both, responsive to determining whether individual scheduling grants are lost; and
   determining whether any one of said scheduling grants is lost, based on detecting an erasure event corresponding to the scheduled transmission.

2. The method of claim 1, wherein detecting an erasure event comprises detecting received signal energy corresponding to the expected receipt of either an information signal or a demodulation reference signal, and comparing the received signal energy to a defined threshold.

3. The method of claim 1, wherein the wireless communication network is an LTE network, and wherein detecting an erasure event comprises:
   monitoring for the absence of Ack/Nack signaling from the mobile terminal on the Physical Uplink Control Channel (PUCCH), in cases where a downlink scheduling grant, but not an uplink scheduling grant, is transmitted to the mobile terminal; and
   monitoring for the absence of Ack/Nack signaling from the mobile terminal on the Physical Uplink Shared Channel (PUSCH) and on the PUCCH, in cases where a downlink and an uplink scheduling grant are transmitted to the mobile terminal in a time order that should cause the mobile terminal to transmit Ack/Nack signaling on the PUSCH.

4. The method of claim 1, wherein the wireless communication network is an LTE network, and wherein detecting an erasure event comprises, in cases where an uplink transmission is expected from the mobile terminal, detecting whether an erasure event occurs by detecting whether an expected demodulation reference signal (DMRS) is received from the mobile terminal on the Physical Uplink Shared Channel (PUSCH), or on a Physical Uplink Control Channel (PUCCH).

5. The method of claim 1, wherein detecting an erasure event, in the case that the scheduling grant is an uplink scheduling grant that schedules an uplink transmission by the mobile terminal, comprises determining that the scheduled uplink transmission was not received at the base station.

6. The method of claim 5, wherein determining that the scheduled uplink transmission was not received at the base station comprises: detecting a characteristically low measure of received signal energy on channel resources corresponding to the scheduled uplink transmission; or detecting said characteristically low measure in combination with detecting a Cyclic Redundancy Check (CRC) failure at the base station, for the scheduled uplink transmission.

7. The method of claim 1, wherein detecting an erasure event, in the case that the scheduling grant is a downlink scheduling grant that schedules a downlink transmission to the mobile terminal, comprises determining that acknowledgment information was not received from the mobile terminal in correspondence with the scheduled downlink transmission.

8. The method of claim 7, wherein determining that the acknowledgment information was not received at the base station comprises detecting a characteristically low measure of received signal energy on channel resources that are associated with the acknowledgment information.

9. The method of claim 1, wherein controlling link adaption of the downlink control channel comprises controlling a coding rate or a transmit power, or both, of the downlink control channel.

10. The method of claim 9, wherein controlling link adaptation of the downlink control channel comprises dynamically selecting a coding rate or a transmit power, or both, of the downlink control channel according to a corrected signal quality estimate maintained for the mobile terminal, and further comprising maintaining the corrected signal quality estimate based on channel quality feedback from the mobile terminal, and a correction factor that is adjusted upward or downward in dependence on whether any given scheduling grant is lost.

11. The method of claim 10, further comprising dynamically maintaining the correction factor for the mobile terminal over the duration of a Radio Resource Control (RRC) connection with the mobile terminal.

12. The method of claim 9, wherein controlling link adaptation of the downlink control channel comprises dynamically selecting a coding rate or a transmit power, or both, of the downlink control channel according to a corrected coding rate value maintained for the mobile terminal, and further comprising maintaining the corrected coding rate value based on channel quality feedback from the mobile terminal, and a correction factor that is adjusted upward or downward in dependence on whether any given scheduling grant is lost.

13. The method of claim 1, wherein controlling the HARQ redundancy version setting, in the case that a given transmitted scheduling grant is a downlink scheduling grant for an initial transmission and is determined to be lost, comprises sending a new downlink scheduling grant to the mobile terminal and resetting the HARQ redundancy version to the same value used in the lost grant.

14. The method of claim 1, wherein controlling the HARQ redundancy version setting, in the case that a given transmitted scheduling grant is an uplink scheduling grant for an initial transmission and is determined to be lost, comprises sending a new uplink scheduling grant to the mobile terminal.

15. A base station for use in a wireless communication network, wherein said base station is configured to detect grant losses for scheduling grants sent over a downlink control channel, and wherein said base station comprises:
    a transceiver configured to transmit signals to mobile terminals, and to receive signals from mobile terminals;
    a scheduler configured to schedule transmissions to or from a mobile terminal by transmitting scheduling grants over the downlink control channel to the mobile terminal;
    one or more controllers configured to control link adaption of the downlink control channel, or HARQ redundancy version settings for the scheduled transmissions, or both, responsive to determining whether individual scheduling grants are lost; and
    a grant loss monitoring circuit configured to determine whether any given scheduling grant is lost, based on detecting an erasure event corresponding to the scheduled transmission.

16. The base station of claim 15, wherein the grant loss monitoring circuit is configured to detect an erasure event based on being configured to detect received signal energy corresponding to the expected receipt of either an information signal or a demodulation reference signal, and compare the received signal energy to a defined threshold.

17. The base station of claim 15, wherein the wireless communication network is an LTE network, and wherein the grant loss monitoring circuit is configured to detect an erasure event based on being configured to:
    monitor for the absence of Ack/Nack signaling from the mobile terminal on the Physical Uplink Control Channel (PUCCH), in cases where a downlink scheduling grant, but not an uplink scheduling grant, is transmitted to the mobile terminal; and
    monitor for the absence of Ack/Nack signaling from the mobile terminal on the Physical Uplink Shared Channel (PUSCH) and on the PUCCH, in cases where a downlink and an uplink scheduling grant are transmitted to the mobile terminal in a time order that should cause the mobile terminal to transmit the Ack/Nack signaling on the PUSCH.

18. The base station of claim 15, wherein the wireless communication network is an LTE network, and wherein the grant loss monitoring circuit is configured to detect an erasure event based on being configured to, for cases where an uplink transmission is expected from the mobile terminal, detect whether an erasure event occurs by detecting whether an expected demodulation reference signal (DMRS) is received from the mobile terminal on the Physical Uplink Shared Channel (PUSCH), or on a Physical Uplink Control Channel (PUCCH).

19. The base station of claim 15, wherein the grant loss monitoring circuit is configured, in the case that the scheduling grant is an uplink scheduling grant that schedules an uplink transmission by the mobile terminal, to detect an erasure event by determining that the scheduled uplink transmission was not received at the base station.

20. The base station of claim 19, wherein the grant loss monitoring circuit is configured to determine that the scheduled uplink transmission was not received at the base station by: detecting a characteristically low measure of received signal energy on channel resources corresponding to the scheduled uplink transmission; or detecting said characteristically low measure in combination with detecting a Cyclic Redundancy Check (CRC) failure at the base station, for the scheduled uplink transmission.

21. The base station of claim 15, wherein the grant loss monitoring circuit is configured, in the case that the scheduling grant is a downlink scheduling grant that schedules a downlink transmission to the mobile terminal, to detect an erasure event by determining that acknowledgment information was not received from the mobile terminal in correspondence with the scheduled downlink transmission.

22. The base station of claim 21, wherein the grant loss monitoring circuit is configured to determine that the acknowledgment information was not received at the base station by detecting a characteristically low measure of received signal energy on channel resources that are associated with the acknowledgment information.

23. The base station of claim 15, wherein the one or more controllers comprise a link adaptation controller that is configured to control link adaption of the downlink control channel by controlling a coding rate or a transmit power, or both, of the downlink control channel.

24. The base station of claim 23, wherein the link adaptation controller is configured to control link adaptation of the downlink control channel by dynamically selecting a coding rate or a transmit power, or both, of the downlink control channel, according to a corrected signal quality estimate maintained for the mobile terminal, and maintaining the corrected signal quality estimate based on channel quality feedback from the mobile terminal, and a correction factor that the link adaptation controller adjusts upward or downward in dependence on whether any given scheduling grant is lost.

25. The base station of claim 24, wherein the link adaptation controller is configured to dynamically maintain the correction factor for the mobile terminal over the duration of a Radio Resource Control (RRC) connection with the mobile terminal.

26. The base station of claim 23, wherein the link adaptation controller is configured to control link adaptation of the downlink control channel by dynamically selecting a coding rate or a transmit power, or both, of the downlink control channel according to a corrected coding rate value maintained for the mobile terminal, and maintaining the corrected coding rate value based on channel quality feedback from the mobile terminal, and a correction factor that the link adaptation controller adjusts upward or downward, in dependence on whether any given scheduling grant is lost.

27. The base station of claim 15, wherein the one or more controllers comprise a HARQ controller, and wherein the HARQ controller is configured, in the case that a given transmitted scheduling grant is a downlink scheduling grant for an initial transmission and is determined to be lost, to control the HARQ redundancy version settings by sending a new downlink scheduling grant to the mobile terminal and resetting the HARQ redundancy version to the same value used in the lost grant.

28. The base station of claim 15, wherein the one or more controllers comprise a HARQ controller, and wherein the HARQ controller is configured, in the case that a given transmitted scheduling grant is an uplink scheduling grant for an initial transmission and is determined to be lost, to control the HARQ redundancy version settings by sending a new uplink scheduling grant to the mobile terminal.

* * * * *